INVENTOR
EDWARD H. SCHULMAN

Hurvitz, Rose & Greene

ATTORNEYS

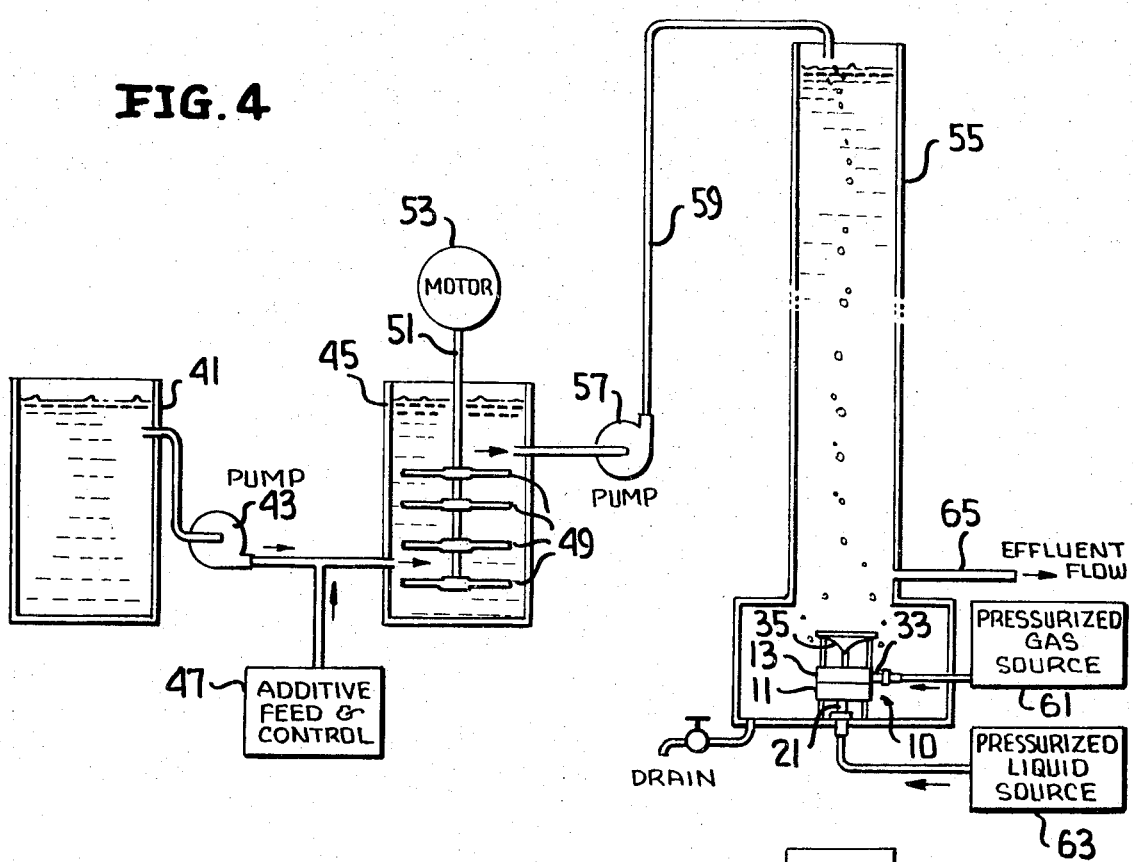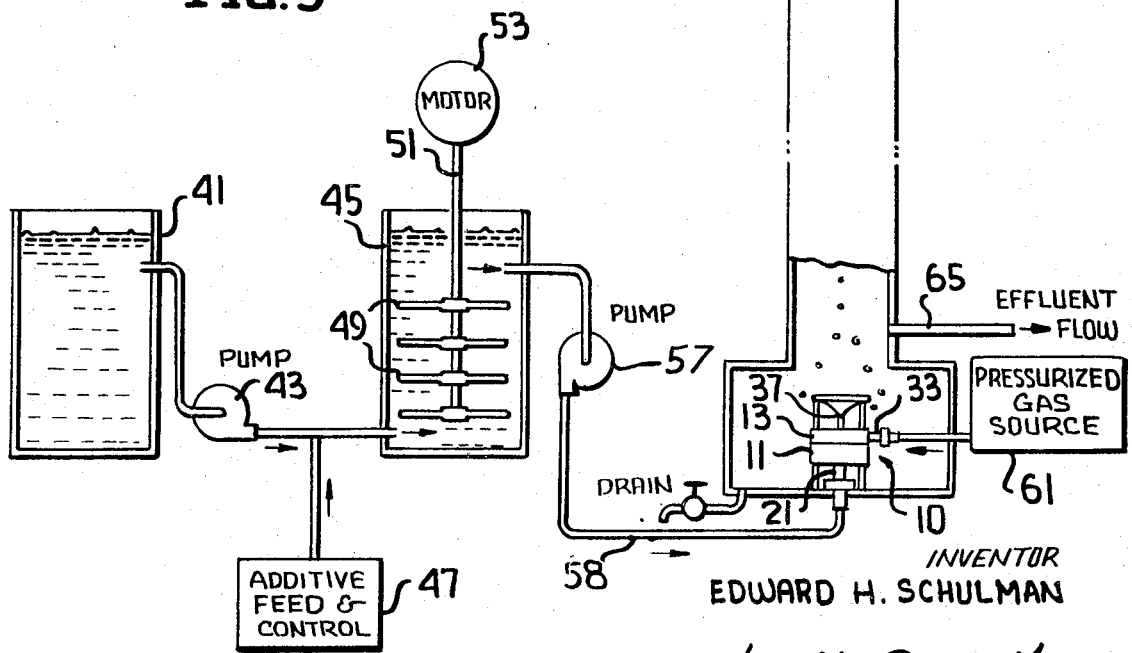

United States Patent Office 3,645,892
Patented Feb. 29, 1972

---

3,645,892
AERATION AND FOAM SEPARATION EMPLOYING VORTEX ELEMENT
Edward H. Schulman, Greenbelt, Md., assignor to Bowles Fluidics Corporation, Silver Spring, Md.
Filed June 13, 1969, Ser. No. 833,011
Int. Cl. B03d 1/00
U.S. Cl. 210—44
15 Claims

ABSTRACT OF THE DISCLOSURE

A vortex valve having supply and control inlet ports is supplied with pressurized gas and pressurized liquid at respective ones of its inlet ports, and provides an output flow comprising the liquid with interspersed tiny gas bubbles. The output flow may be employed to transfer the gas bubbles to a body of liquid for aeration purposes. Alternatively the output flow is employed in foam separation processes wherein the tiny gas bubbles efficiently induce flotation of surface-active or flocculent material suspended or otherwise immersed in a body of liquid.

BACKGROUND OF THE INVENTION

The present invention relates to improved aeration techniques for purifying and/or separating solids from liquids.

It is frequently desirable to transfer gas into a liquid for purposes of promoting various biological and chemical processes. More specifically, in the field of water pollution control it is desirable to transfer oxygen to polluted water in order to reduce the oxygen demanded by various impurities. The amount of oxygen required by a contaminated body of water to achieve a predetermined standard of purity is generally referred to as its biological oxygen demand (BOD) or chemical oxygen demand (COD) in accordance with the type of process involved. In the case of sewage treatment, for example, bacteriological wastes deplete the oxygen level of the contaminated water, in some cases causing the latter to become septic or rendering the body of water into which the waste water is released unsuitable for habitation by various forms of marine life. Some pollutants are volatile solvents or gas which can be removed from the contaminated water by chemical stripping. One method for satisfying the BOD and COD of a liquid is aeration. The term aeration, as employed herein, refers to the diffusion of a gas into a liquid. For the most part the present invention is concerned with diffusion of air into water; however, the methods and apparatus disclosed are intended to have general applicability to the diffusion of gases into liquids.

Aeration-type techniques are also employed in foam separation processes wherein diffused gas bubbles are dispersed in a body of liquid to induce flotation of substances dispersed in the liquid. The substances to be separated, if not naturally either flocculent or surface-active, are chemically treated so as to be rendered either flocculent or surface-active in order to induce their collection at liquid gas interfaces. Gas is then bubbled through the liquid to generate multiple gas-liquid interfaces which attract the surface-active substances which are then floated to the liquid surface as a readily removable foam. The various types of foam separation techniques are described and categorized in a paper by Alan J. Rubin, entitled "Removal of Trace Metals by Foam Separation Techniques," appearing in Journal of American Water Works Association, vol. 60, No. 7, July 1968, pages 832–846.

The terms "flocculent" and "surface-active" as used herein are intended to convey specific meanings. More particularly, different materials may be removed from a transporting liquid in a number of different ways. Non-separable suspended matter and some dissolved solids may be converted into separable solids which become amenable to flotation by flocculation and precipitation with chemicals. Coagulation and precipitation produce finely divided or colloidal suspensions. These suspensions are converted into settleable solids or solids suitable for flotation by agglomeration in a quiescent fluid. Colloids agglomerate because of collisions resulting from their Brownian movement; the suspended and divided solids come into contact with one another when more rapidly settling solids overtake slowly settling solids. Consequently, flocs of ever increasing size are formed. The floc growth is exceedingly slow unless it is hastened by stirring the suspension liquid, which increases the number of collisions or contacts. The increased opportunity for contact is called flocculation. It may be provided by hydraulical or mechanical means including the injection of air. Material which is susceptible to such floc growth is called flocculent material. The use of flocculating or flotation agents may add as many as three ancillary functions to flotation:

(1) rapid distribution of the agent throughout the water to be treated;
(2) reduction of the time for floc growth to take place; and
(3) return of floc to the influent for the purpose of promoting flocculation.

The coagulation, precipitation, flocculation chain may be used for ion exchange and demineralization as well as various other processes. De-ionization, de-mineralization, or de-ashing embraces the removal of substantially all ionizing materials which leave a residue on evaporation. Conceivably, by the proper addition of selected chemicals almost any material or substance can be removed from any liquid. For example, various ion and molecular groups could be chemically bound to a chemical which would then precipitate and hence be removed by a foam separation process.

Surface-active materials are those which are naturally attracted to a gas liquid interface. This attraction, while not fully understood or explored, is thought to occur because of electric charges which exist between the suspended material and the gas liquid interface. The charge referred to is believed to come about due to the molecular structure of the particular substance involved. Materials which are not naturally surface-active can be removed by effectively coating them with a suitable chemical which renders them surface-active. It is thought that the chemical which renders the material surface active forms a coating on the non surface-active material which behaves as a skin of electric charge, thereby allowing this normally non-surface active material to be attracted to the gas-liquid interface of the bubble.

In aeration and foam separation processes it is important to minimize the size of the deffused gas bubble. More specifically the rate of diffusion of a gas into a liquid is known to be proportional to the area across which diffusion occurs. It can be shown that for equal volumes of diffused gas, the diffusion area is inversely proportional to the radius of the diffused gas bubble. Hence, smaller bubbles are more efficient than larger bubbles in aeration processes because the former afford a larger diffusion area. Likewise in foam separation processes small gas bubbles present greater gas-liquid interface area than large bubbles and therefore are more efficient in attracting surface-active substances dispersed in the liquid.

Another important consideration in foam separation processes is the gas flow rate. For example, in precipitate flotation, where the substance to be removed is rendered flocculent by appropriate chemical additives introduced into the liquid, a low gas flow rate is required to prevent redispersal of the flocculent material by highly turbulent gas flow. In other foam separation processes increased gas flow rates generally result in increased substance removal because of the incerased gas-liquid surface area. However, increased gas flow results in a wetter foam with lower concentrations of the removed substance. Decreasing gas flows on the other hand no only yields smaller volumes of foam with higher concentrations of the removed material but in addition results in reduced power requirements for the process involved. Further, for many foam separation processes, removal of small volumes of concentrated foam from the liquid surface is much more efficiently effected than removal of large volumes of dilute foam.

Industrial users of foam separation processes have attempted to achieve air bubble sizes on the order of .020 inch or less for both high and low gas flow rate processes. In one prior art approach pressurized gas is applied to a large manifold having outlet ports of the desired bubble size which issue bubbles into the liquid body to be aerated or otherwise processed. The small openings tend to clog, reducing the gas flow. Increasing the opening size renders the bubbles too large for desired system efficiency. Diffusers made of porous material may also be employed for this function. However, they tend to clog due to dirt and soot lodging in the porous media. In addition, sewage liquor tends to foster growth of slimes which also clog the porous media.

Another approach to aeration employs spargers, which are large orifice diffusers having internal ducts terminating in exhaust ports. Bubble size in sparger output flow is typically much larger than that obtained with porous media diffusers and that which is desirable for optimum efficiency in most aeration and foam separation processes. In addition, spargers have relatively high gas flow characteristics, further reducing their efficiency.

Current techniques for reducing the bubble size of gases flowing into liquids involves the addition of a frother. More specifically, to form small air bubbles in water, a frother is added to the water in concentrations on the order of 1000 p.p.m. (part per million). The frother, usually alcohol, detracts from the economic desirability of the foam separation process in sewage treatment and in some cases renders the process non-feasible because of the pollutant effect of the alcohol.

Still another prior art approach to generate small gas bubbles for foam flotation processes may be found in U.S. Pat. No. 3.418,236 to Mail. In this approach water and air are mixed under pressure until the water is saturated with air. The saturated air is then depressured and isolated for a specified period of time to permit the air to precipitate in the form of bubbles. When the air has precipitated to the desired bubble size it is injected into a flotation tank containing water and flocculent material to be separated. This approach has a number of disadvantages. For one thing, the rate at which water can be saturated with air is limited, thereby limiting the gas flow rate to the flotation tank. For another thing the isolation time period is rather crucial to this method; if the timing is not precise the injected water-air mixture may have no bubbles or oversized bubbles. This renders the process unduly complex.

It is an object of the present invention to provide a method and apparatus for providing small gas bubbles for aeration and associated processes.

It is another object of the present invention to improve the efficiency of foam separation processes by providing a method and apparatus for flowing small gas bubbles through a liquid in which a surface active substance or substances rendered surface active is dispersed.

It is another object of the present invention to improve the efficiency of foam separation processes by providing a method and apparatus for generating small gas bubbles in a liquid contained in a flotation tank without requiring the addition of frothing agent to the liquid.

It is still another object of the present invention to provide a simple method and apparatus for mixing gas and liquid to form sufficiently small gas bubbles for efficient operation of aeration and foam separation processes.

SUMMARY OF THE INVENTION

The present invention comprises the utilization of a vortex element as a device for mixing gas and liquid to achieve extremely small gas bubbles. The vortex element comprises supply and control inlet ports to which the gas and liquid, both under pressure, are individually applied. The fluids are intermixed in a vortical flow pattern to provide an outlet flow comprising the liquid with interspersed gas bubbles of controllable size. The vortex element outlet flow may be employed in simple aeration processes, in diffusing gases in liquids, and in gas flow flotation processes.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein:

FIGS. 4 and 5 are diagrammatic illustrations of alternative foam separation systems according to the present invention.

DESCRIPTION OF THE PREFERRED EMBODIMENTS

Figure 1:
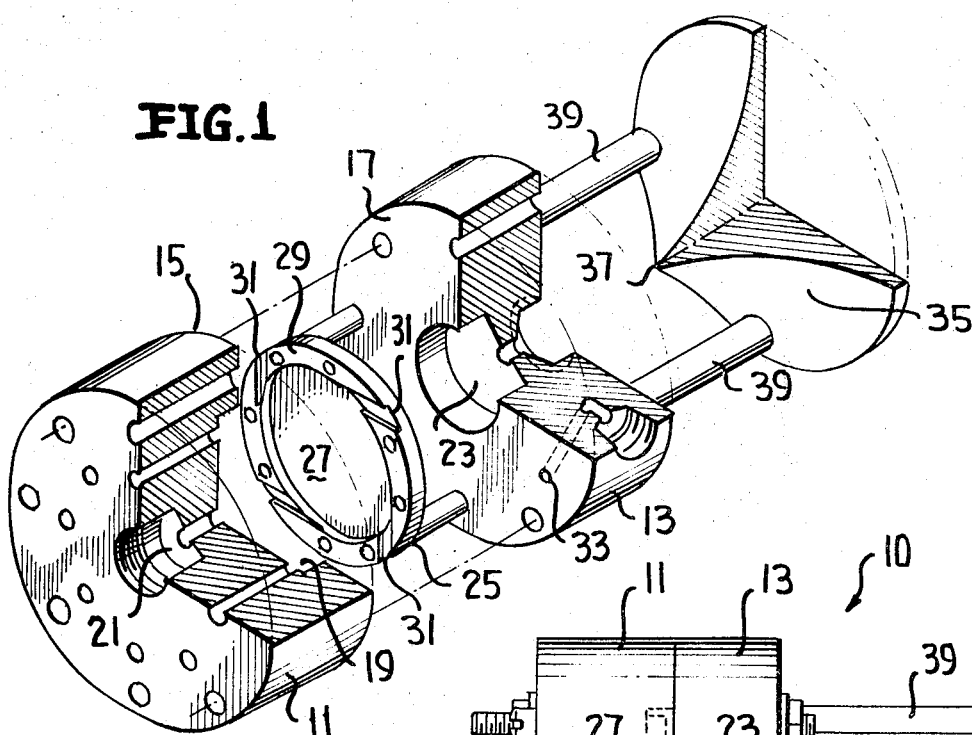
FIGS. 1 and 2 are perspective and plan views respectively of a preferred, though not exclusive, vortex element suitable for use in the present invention.
Figure 2:
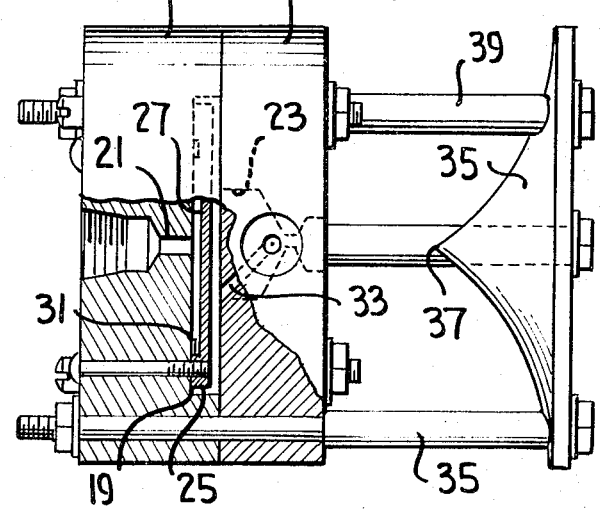

Referring now specifically to FIGS. 1 and 2 of the accompanying drawings, there is illustrated a vortex element assembly 10 comprising a pair of plate members 11 and 13 of aluminum, plastic or similar material, bolted or otherwise secured to one another with respective surfaces 15 and 17 thereof in abutting relationship. A gasket or other fluid sealing means (not illustrated) may be interposed between the plate members as necessary to prevent leakage of fluid therebetween. A hollow cylindrical depression 19 is formed in surface 15 of plate member 11. Fluid is introduced axially into depression 19 by means of fluid supply passage 21 extending through plate member 11 along the longitudinal axis of the cylindrical depression. Fluid egress from depression 19 is provided by fluid passage 23 extending through plate member 13 in longitudinal alignment with fluid passage 21.

An interior plate member 25 of circular configuration has a diameter which is slightly smaller than the diameter of depression 19 and a thickness which is substantially smaller than depth of depression 19. One side of interior plate member 25 has a centrally disposed circular recessed portion 27 bounded by a flat circular rim 29. Four equi-spaced channels 31 are defined in and extend across rim 29 in tangential orientation to the periphery of recess 27.

Interior plate member 25 is bolted or otherwise secured to plate member 11 with rim 29 disposed flush against the base of depression 19. Pressurized fluid entering depression 19 via fluid passage 21 is therefore caused to impact against the center of recessed portion 27 and flow radially outward toward rim 29. Tangential channels 31 conduct the fluid to the periphery of rim 29, imparting a tangential flow component to the fluid relative to the longitudinal axis of cylindrical depression 19. The space between the peripheral boundary of plate 25 and the sidewall of depression 19 permits the fluid in channels 31 to flow around the periphery of plate 25 toward surface 17 of plate member 13. The tangential flow component introduced by channels 31 creates a vortical flow pattern with fluid passage 23 serving as a drain passage at the center of the vortex. The outlet flow pattern through passage 23 is helical (combined axial and vortical).

A control fluid passage 33 extends through plate member 13 between its peripheral wall and surface 17. The location at which passage 33 terminates at surface 17 is radially displaced from the longitudinal axis of depression 19 by a distance which is less than the radius of depression 19. In addition passage 33 extends through plate member 13 at an acute angle relative to the plane of surface 17 and in a direction such that pressurized fluid applied to passage 33 is issued in aiding relation to the vortical flow between surface 17 and plate 25. In addition to re-inforcing voticity in this region and the vortical component of the helical outlet flow, control fluid thusly introduced tends to mix with the supply fluid. Where either the supply or control fluid is gas and the other is liquid, the outlet flow comprises a helical flow pattern of liquid interspersed with bubbles of the gas.

A cusped flow divider 35 having an apex 37 is secured to plate members 11 and 13 by means of bolts or the like. Flow divider 35 is disposed with apex 37 facing upstream into the outlet flow from fluid passage 23 and is spaced somewhat downstream of plate member 13 by means of standoffs 39 or the like. The purpose of flow divider 35 is to enhance flow dispersion for the flow issuing from passage 23, thereby reducing any tendency the bubbles may have to coalesce and form larger and less efficient bubbles. The flow divider feature is entirely optional and need not necessarily be employed in accordance with principles of the present invention. Further, a flow divider feature may be achieved by directing the output of the vortex element at a nearby surface.

A vortex element of the type described has been found to be capable of injecting gas bubbles having diameters on the order of .015 inch into a body of liquid. More specifically, an element, such as vortex element assembly 10, was installed in the bottom of a clear plastic vessel filled with water to a depth of ten feet. The water depth was selected as representative of industrial sewage processing tank depths. The clear plastic vessel permitted photographic monitoring of the bubble size in the valve outlet flow. The important parameters of the vortex element appear below in Table I; these dimensions are exemplary of a specific embodiment only and are not intended to be limiting on the scope of the present invention.

TABLE I

Diameter of depression 19—2.0 inches
Depth of depression 19—0.2 inch
Thickness of plate 25—0.12 inch
Depth of recess 27—0.036 inch
Depth of channel 31—0.014 inch
Width of channel 31—0.062 inch
Diameter of recess 27—1.50 inches
Diameter of plate 25—1.875 inches
Angle between passage 33 and surface 17—45°
Termination of passage 33 from axis—0.375 inch
Diameter of passage 23 at surface 17—0.75 inch
Diameter of passage 21 at surface 15—0.125 inch
Pressure of air applied to supply passage 21—25 p.s.i.g.
Pressure of water applied to control passage 33—40 p.s.i.g.
Air flow rate—0.32 cu. ft./min.
Water flow rate—0.0334 cu. ft./min.

It is to be stressed again that the parameters in Table I are illustrative only. Similarly small bubbles have been obtained where air is applied to the control passage and water to the supply passage. In addition, the dimensions, as well as the valve configuration, may be changed and still achieve smaller bubble size than achieveable in prior art aeration, gas diffusion and foam separation processes. It is the vortical mixing action of the gas and liquid that is important here. The fact that both the fluids tend to flow vortically, independently of one another, serves to further enhance the mixing action whereby small gas bubbles are formed. Other types of vortex elements which may be suitable for aeration and foam flotation functions may be found in U.S. Pat. No. 3,431,930, and the paper by E. A. Mayer and P. Maker, "Control Characteristics of Vortex Valves," Proceedings of the Fluid Amplification Symposium, May 1964, vol. II, page 61.

Figure 3:
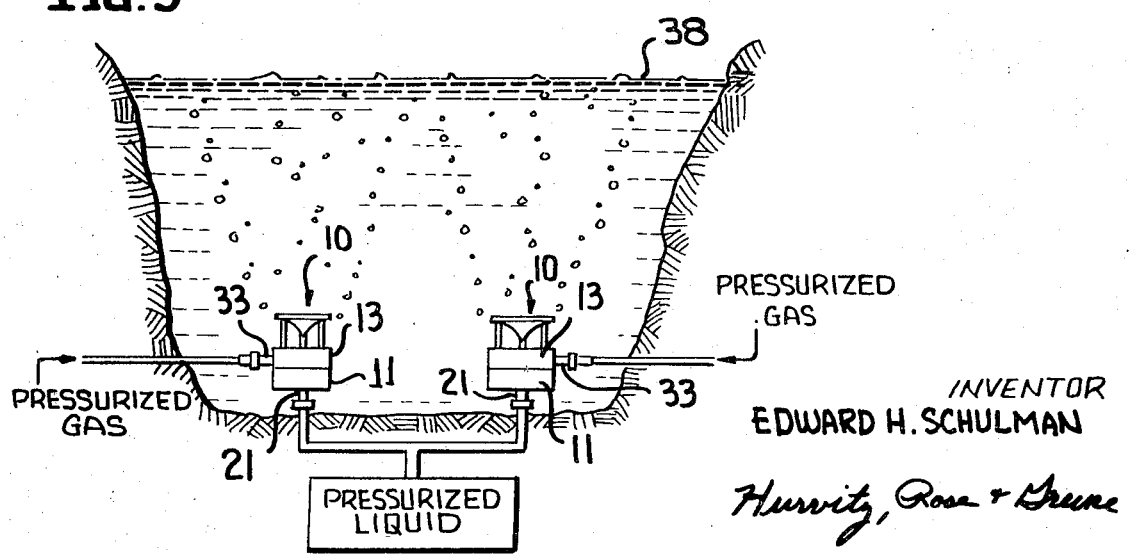
FIG. 3 is a diagrammatic illustration of an aeration apparatus constructed in accordance with the principles of the present invention.

Referring now to FIG. 3 of the accompanying drawings there is illustrated diagrammatically a body of polluted or contaminated liquid 38. The liquid may be either still or flowing and may, for example, be a stream or river flowing perpendicular to the plane of the drawing. One or more vortex elements 10 are spaced apart to form a line along the bottom of the river bed and are supplied with pressurized gas, for example air, at their control passages 33 and pressurized liquid, for example water, at their supply passages 21. The pressurized fluids could be interchanged as described above and applied to either the control or supply passages. The pressurized water is preferably recirculated, as by means of a pump arrangement (not illustrated) from a location downstream of the vortex elements.

The vortex element 10 provides outlet flows comprising water interspersed with tiny air bubbles which efficiently operate to aerate and hence aid in purifying the river. In effect these elements provide a curtain of bubbles through which the river must flow and which acts as a filter to remove harmful bacteria and volatile chemical impurities.

Referring now to FIG. 4 of the accompanying drawings there is illustrated diagrammatically a system employing the principles of the present invention in a foam separation process. The system comprises a receiving tank 41 to which influent liquid is supplied. The influent liquid may be sewage to be purified, a solution from which some constituent is to be separated, a suspension from which suspended solids are to be removed, or any general body of liquid from which dispersed substances are to be removed. The liquid in tank 41 may be delivered by means of a pump 43 to vessel or tank 45 in which the liquid may be mixed with appropriate chemical additives. Additive is introduced into tank 45 at a feed rate appropriate to the feed rate of liquid from tank 41, by means of an additive feed and control unit 47. The latter by way of example, may be of the type described in U.S. Pat. No. 3,117,082 to Schluter. For example, if the liquid in tank 41 is a bentonite (clay) solution, lauric acid and aluminum sulfate are appropriate additives in concentrations on the order of 157 p.p.m. each. Additives appropriate to removal of various other substances from a liquid are described in the above referenced paper by Rubin as well as in the references cited in the bibiography attached thereto.

The liquid and additive(s) are mixed in tank 45 by paddles 49, secured to shaft 51. The shaft and hence the paddles are rotated by motor 53 at a slow rate so as to stir the liquid in tank 45 without appreciable agitation or vertical movement. In this way the flocculent or surface-active material is permitted to form in tank 45. The particular apparatus described for mixing is illustrative only; any suitable non-agitating mixing apparatus is suitable for this function. Of course where the liquid in tank 41 already contains the substances to be removed in flocculent or surface-active condition, tank 45 and its function may be dispensed with and the liquid in tank 41 may be conducted directly to flotation tank 55.

The liquid from tank 45 flows to flotation tank 55 via tubing 59. In some cases a pump 57 may be desirable. Secured at the bottom of tank 55 is a vortex element assembly of the type described above. A pressurized gas source 61, for example pressurized air, is connected to the inlet port of control passage 33; a source of pressurized liquid 63, for example water, is applied to the inlet port of supply passage 21 of valve assembly 10. An outlet passage 65 from tank 55 conducts effluent flow therefrom, the effluent flow comprising the original liquid (influent)

from tank 41 absent the flocculent or surface-active material introduced therewith into tank 55. The flocculent or surface-active material suspended in the influent is separated from the liquid by the foam separation or flotation processes described hereinabove. More specifically, the suspended flocculent or surface-active material attach to the tiny bubbles of air which issue as part of the outlet flow from element 10 and rise to the top of the liquid level in tank 55 after being dispersed by flow divider 35. The material thusly absorbed collects at the surface of the liquid in a foam which can be skimmed or otherwise removed from the top of tank 55.

An alternative arrangement to that illustrated in FIG. 4 is presented in FIG. 5 wherein like elements are designated by the same reference numerals as in FIG. 4. The difference between the two arrangements is the utilization, in FIG. 5, of the liquid flow from the tank as both inflow to tank 55 and supply fluid to vortex valve 10. More specifically, pump 57 delivers fluid plus flocculent or surface-active material from tank 45 to the inlet port of supply passage 21 via tubing 58. The separation of the flocculent or surface-active material from the liquid proceeds as described above in relation to FIG. 4; however, the arrangement of FIG. 5 conserves water (or other liquid) since a separate source is not required to supply liquid to valve 10.

The arrangement illustrated in FIGS. 4 and 5 are suitable to remove a wide variety of substances dispersed in wide varieties of liquid; removal of oil from water, recovery of bitumen from bituminous sand, purification of waste liquids, removal of trace metals from solution, and de-salinization of water are all examples of functions which can be performed by the apparatus and method described in relation to FIGS. 4 and 5.

While I have described and illustrated specific embodiments of my invention, it will be clear that variations of the details of construction which are specifically illustrated and described may be resorted to without departing from the true spirit and scope of the invention as defined in the appended claims.

I claim:

1. A method of aerating a body of liquid, comprising:
   independently flowing a pressurized supply liquid and a pressurized gas in mutually aiding and inwardly-directed vortical flow patterns to cause said supply liquid and said gas to mix and provide a resultant vortical flow comprising said supply liquid with interspersed small bubbles of said gas, said resultant vortical flow pattern comprising a whirling flow having a decreasing pressure gradient from its exterior to its center; and
   issuing said resultant vortical flow into said body of liquid at a location below the surface of said body of liquid.

2. A method of aerating a body of liquid, comprising:
   issuing a pressurized supply liquid and a pressurized gas independently and with respective tangential flow components into a vortex chamber to provide a resultant inwardly-directed vortical flow comprising said supply liquid with interspersed bubbles of said gas, said resultant vortical flow pattern comprising a whirling flow having a decreasing pressure gradient from its exterior to its center; and
   issuing said resultant flow into said body of liquid below the surface of said body of liquid;
   whereby said gas bubbles rise toward said surface and are dispersed in said body of liquid.

3. The method according to claim 1 further including the step of dispersing said bubbles of said gas to minimize their coalescence.

4. The method according to claim 1 wherein said supply liquid and the liquid in said body of liquid are substantially the same.

5. The method according to claim 1 wherein said gas bubbles have diameters on the order of .020 inch or less.

6. The method according to claim 1 employed in a foam separation process wherein said body of liquid has dispersed therein surface-active material which is adsorbed on said gas bubbles and rises to the surface of said body of liquid with said bubbles to form a stable foam.

7. The method according to claim 5 wherein said body of liquid is formed by the step of mixing liquid containing non-surface-active impurities and a chemical additive which renders said impurities surface-active.

8. The method according to claim 1 employed in a foam separation process wherein said body of liquid has dispersed therein flocculent material which is attracted to said bubbles and carried therewith to the surface of said body of liquid to form a stable foam.

9. The method according to claim 1 wherein said body of liquid is a flowing stream and wherein said resultant flow provides a curtain of gas bubbles through which said stream flows.

10. The method according to claim 2 wherein liquid in said body of liquid is water, wherein said resultant flow is issued into said body of liquid at a depth of approximately ten feet, and wherein said gas bubbles have diameters on the order of .020 inch or less.

11. The method according to claim 2 employed in a foam separation process wherein said body of liquid has surface-active material dispersed therein which is absorbed on said gas bubbles and rises therewith to the surface of said body of liquid to form a stable foam.

12. The method according to claim 11 wherein said body of liquid is formed by the step of mixing liquid containing non-surface-active impurities with a chemical additive which renders said impurities surface-active.

13. The method according to claim 2 employed in a foam separation process wherein said body of liquid has flocculent material dispersed therein which is attracted to said gas bubbles and rises therewith to form a stable foam at the surface of said body of liquid.

14. The method according to claim 13 wherein said body of liquid is formed by the step of mixing liquid containing non-flocculent impurities with a chemical additive which renders said impurities flocculent.

15. The method according to claim 14 wherein said supply liquid is substantially the same liquid as in said body of liquid.

References Cited

UNITED STATES PATENTS

| | | | |
|---|---|---|---|
| 2,178,239 | 10/1939 | McKenna | 261—93 |
| 3,054,747 | 9/1962 | Gaden et al. | 210—44 |
| 3,418,236 | 12/1968 | Mail | 210—44 |
| 3,452,966 | 7/1969 | Smolski | 210—14 X |
| 3,470,091 | 9/1969 | Budd et al. | 210—220 X |

REUBEN FRIEDMAN, Primary Examiner

T. G. WYSE, Assistant Examiner

U.S. Cl. X.R.

210—221; 261—93